United States Patent [19]

Kilsdonk

[11] Patent Number: 5,651,924

[45] Date of Patent: Jul. 29, 1997

[54] METHOD FOR MANUFACTURING LIGHT PANELS

[75] Inventor: Roger Louis Henri Kilsdonk, Rotterdam, Netherlands

[73] Assignee: Tchai Lights B.V., Netherlands

[21] Appl. No.: 370,560

[22] PCT Filed: Nov. 7, 1991

[86] PCT No.: PCT/NL91/00220

§ 371 Date: May 10, 1993

§ 102(e) Date: May 10, 1993

[87] PCT Pub. No.: WO92/00220

PCT Pub. Date: Dec. 4, 1992

Related U.S. Application Data

[63] Continuation of Ser. No. 64,053, May 10, 1993, abandoned.

[30] Foreign Application Priority Data

| Nov. 9, 1990 | [NL] | Netherlands | 9002457 |
| Jul. 5, 1991 | [NL] | Netherlands | 9101173 |

[51] Int. Cl.⁶ .................................................. B29D 11/00
[52] U.S. Cl. .................. 264/1.26; 264/1.27; 264/1.37; 264/1.7; 264/2.7; 264/335; 264/337
[58] Field of Search .................. 264/1.24, 1.28, 264/335, 338, 1.26, 1.25, 1.27, 1.37, 1.7, 2.7, 334, 337; 427/163

[56] References Cited

U.S. PATENT DOCUMENTS

| 1,662,365 | 3/1928 | Comstock. | |
| 3,365,524 | 1/1968 | Thompson. | |
| 3,669,708 | 6/1972 | Reber et al.. | |
| 3,697,635 | 10/1972 | Dietzsch et al.. | |
| 3,704,223 | 11/1972 | Dietzsch et al.. | |
| 3,853,658 | 12/1974 | Ney | 156/180 |
| 4,098,856 | 7/1978 | Rosenau. | |
| 4,154,888 | 5/1979 | Dewey. | |
| 4,624,899 | 11/1986 | Macaigne et al.. | |
| 4,786,454 | 11/1988 | Oddenino. | |
| 4,961,884 | 10/1990 | Watanabe et al. | 264/335 |
| 4,971,733 | 11/1990 | Baron | 264/1.24 |
| 5,160,565 | 11/1992 | Chazalon et al. | 264/1.25 |
| 5,160,689 | 11/1992 | Kamen. | |

FOREIGN PATENT DOCUMENTS

| 0260742 | 9/1987 | European Pat. Off.. |
| 0314353 | 10/1988 | European Pat. Off.. |
| 0338774 | 4/1989 | European Pat. Off.. |
| 2575168 | 12/1984 | France. |
| 1544699 | 5/1969 | Germany. |
| 1529969 | 5/1969 | Germany. |
| 1479420 | 7/1969 | Germany. |
| 57-8519 | 1/1982 | Japan. |
| 489259 | 4/1970 | Switzerland. |
| 2228097 | 8/1990 | United Kingdom. |

*Primary Examiner*—Mathieu D. Vargot
*Attorney, Agent, or Firm*—Brooks & Kushman P.C.

[57] ABSTRACT

A method for manufacturing light panels consisting of a plate shaped carrier with light conducting fibers fixed therein according to a given pattern. The method includes the steps of inserting the top end of each fiber from a fiber supply through openings in a mold. The mold is then filled with a castable plastic layer which is allowed to set to form a carrier. The carrier retains the fibers with the top ends of the fibers extending above the carrier. The top ends of the fibers extending above the carrier are melted by heat from a laser to form a melted nob at the top end of each fiber to act as a lens. A cover layer is applied on the carrier to embed the top end of each fiber and to protect the carrier. The carrier can be removed from the mold to allow the mold to be refilled with another castable plastic layer to form a next carrier for repeating the process. Removable plugs may be initially inserted into the openings of the mold to facilitate removal of the carrier at a desired angle. The bottom end of the fibers beneath the carrier may be compressed together into a bundle and cut to form a light intake head.

28 Claims, 4 Drawing Sheets

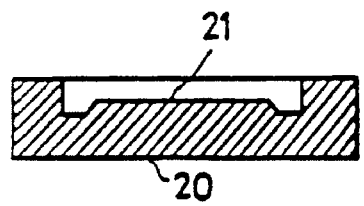
FIG.7A
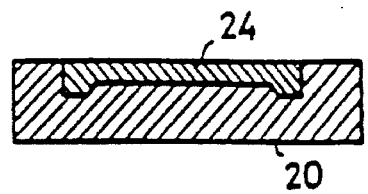
FIG.7D
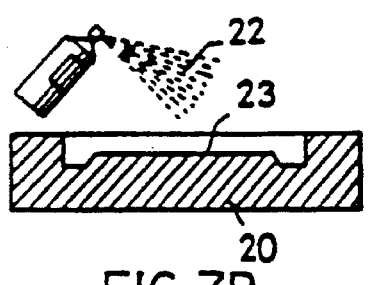
FIG.7B
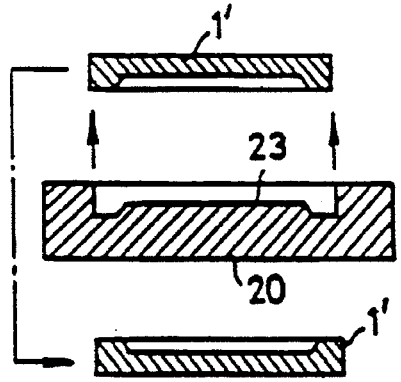
FIG.7E
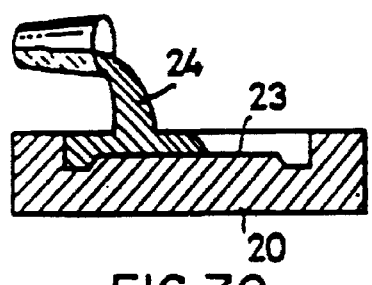
FIG.7C
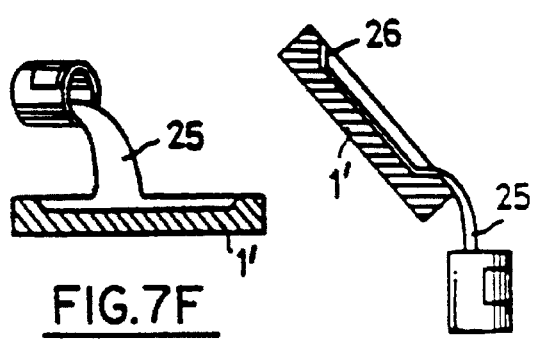
FIG.7F
FIG.7G
FIG.7H
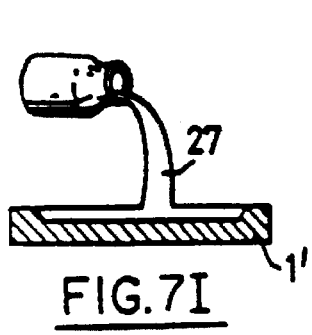
FIG.7I
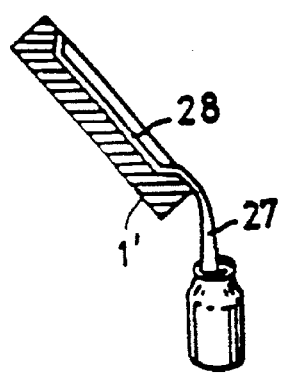
FIG.7J
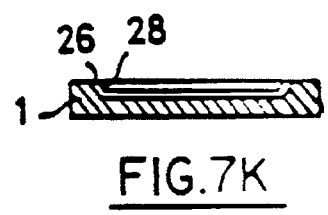
FIG.7K 5,651,924

METHOD FOR MANUFACTURING LIGHT PANELS

This is a continuation of application Ser. No. 08/064,053 filed on May 10, 1993, now abandoned.

TECHNICAL FIELD

The invention relates to a method for manufacturing light panels.

1. Background of the Invention

Providing light conducting fibres in light panels for forming a light-emitting representation requires fixing the ends of these fibres in the desired pattern in a plate-shaped panel, in particular made of plastics. The known methods for this purpose are cumbersome, and do not allow to manufacture large numbers of such panels in an economically acceptable manner.

2. Object of the Invention

It is an object of the invention to provide a method for this purpose, allowing to manufacture such panels in a fast and economic manner in series.

BRIEF DESCRIPTION OF THE DRAWINGS

FIGS. 7(A-K) are diagrammatical representations of successive steps of a method for manufacturing a forming mould to be used in the method according to the preceding Figures.

DESCRIPTION OF THE PREFERRED EMBODIMENTS

Figure 1:
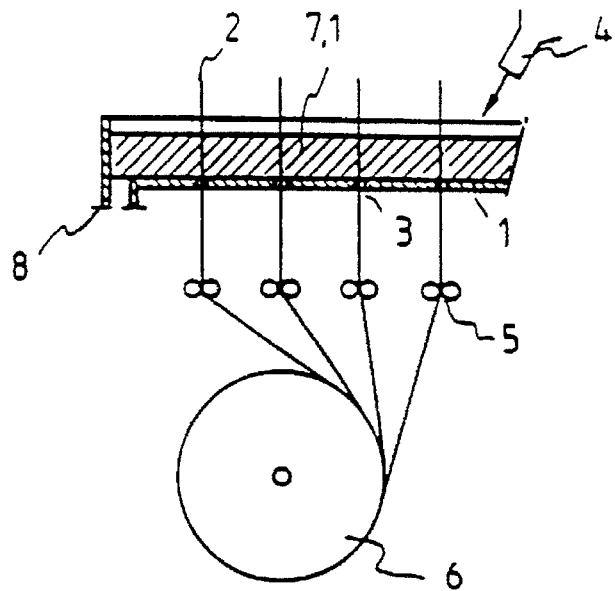
FIGS. 1, 2A, 2B and 3 show simplified diagrammatical representations of consecutive steps in an embodiment of the method of the invention.

In FIGS. 1, 2A, 2B and 3, consecutive steps of a preferred embodiment of the method according to the invention are diagrammatically shown.

The device required thereto comprises an open through-shaped forming mould 1, the bottom of which being provided, in the points where light conducting fibres 2 are to be arranged, with holes 3. Above the mould 1 a casting funnel 4 can be arranged for casting a fast setting plastics into the mould 1.

Below the holes 3 fibre guides 5 are present, which serve for guiding the fibres 2 towards these holes, which guides 5 are made sufficiently braking in order to keep said fibres under some tension. These fibres are supplied by spools 6, only one thereof being shown in FIG. 1, and several fibres 2 are being wound on one spool 6, which is favourable for reasons of space economy in the case of large numbers of fibres to be applied. It is of course possible to use one spool 6 for each fibre, which can be provided with a brake for keeping the fibre tensioned, and then the guides 5 might be left out if required.

The plastics cast in the forming mould forms after setting a first panel 7.1, in which the extremities of the fibres 2 are fixed.

Figure 2A:
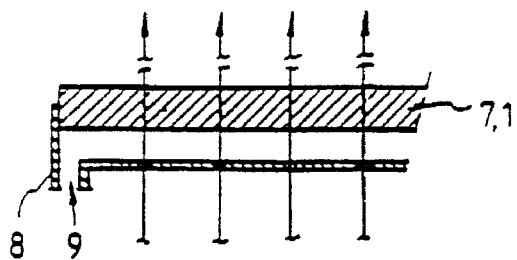
Figure 2B:
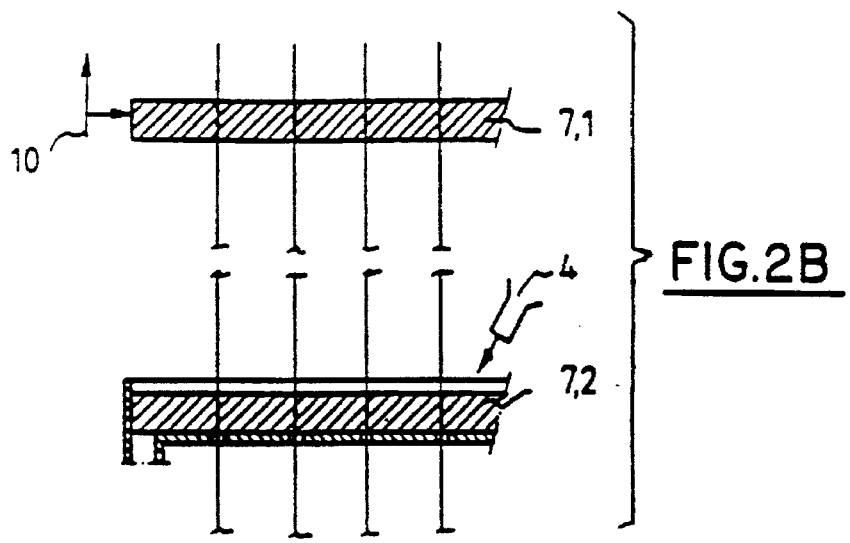

In order to remove the panel 7.1 from the mould, compressed air is introduced first through one or more bottom connections 8 as shown at 9 in FIG. 2A. Thereby the set panel 7.1 is loosened from the forming mould 1, and can be pulled away by a gripper shown schematically at 10 in FIG. 2B, and then the fibres 2 will be unwound further from the spools 6 until the fibres 2 below the panel 7.1 have reached the required length. Thereafter plastics can be cast again by means of the funnel 4 into the mould 1 for forming a subsequent panel 7.2.

The fibres 2 are then kept tensioned in such a manner that they will not be sent sidewards by the plastics mass flowing into the mould.

Figure 3:
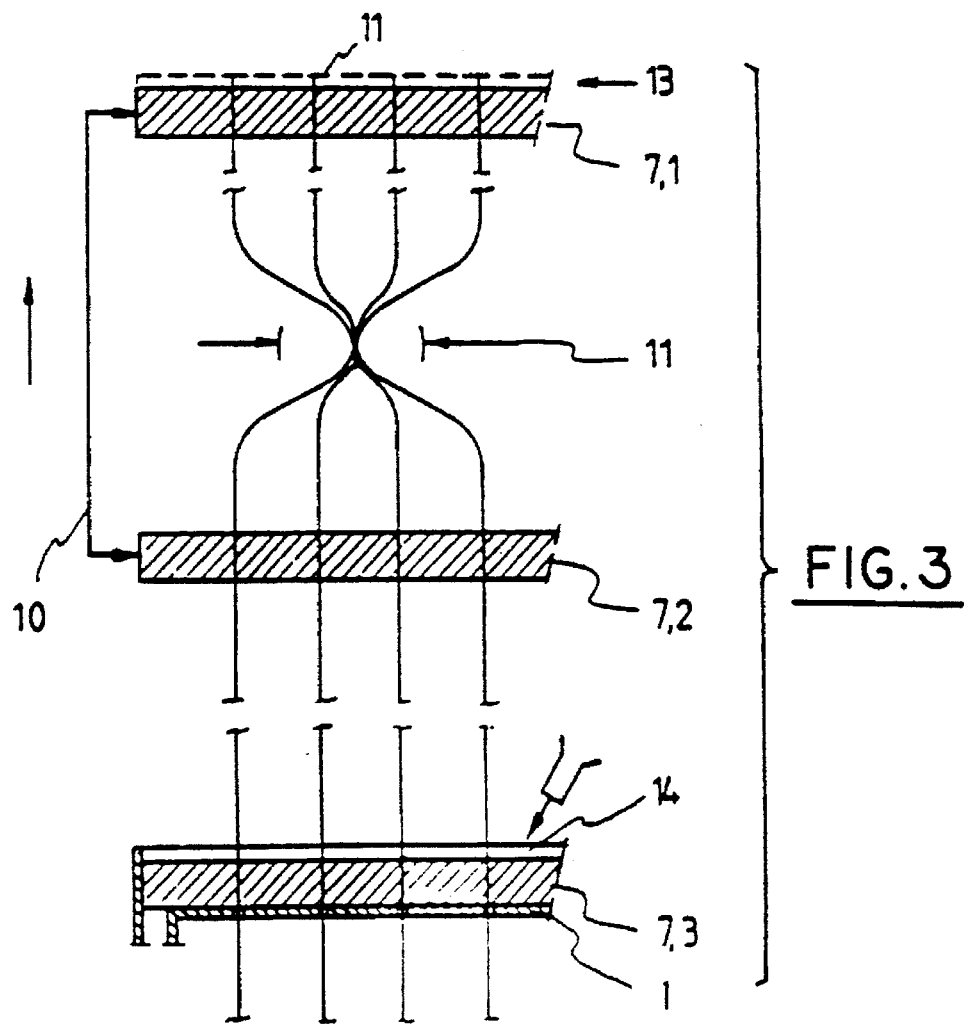

FIG. 3 shows a subsequent step after removing the panel 7.2 from the mould 1 after having set in the meantime. The panels 7.1 and 7.2 are being jointly pulled upwards by means of the gripper 10 until the fibres 2 pulled through the mould 1 have reached again the desired length. Thereafter plastics is cast into the mould 1 for forming the next panel 7.3.

In the meantime the fibres can be taken together near the upper side of the panel 7.2, as shown at 11, and be glued together in order to form a light intake head 12 which is cut from the underlying fibres. At the upper side of the panel 7.1 the extending fibre extremities are cut or sawed off, as indicated at 13.

Figure 4A:
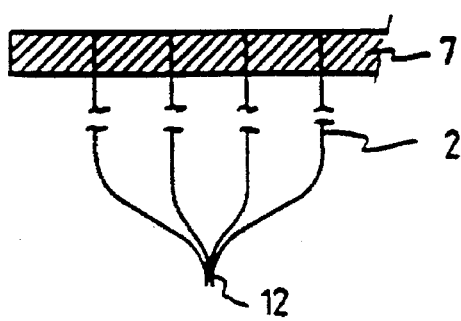
FIGS. 4A and 4B show simplified representations of the panels thus obtained.

The cut-off panel has, after removing it from the gripper 10, the form shown in FIG. 4A.

The subsequent steps are equal to the preceding step according to FIG. 3. The operation is continuous with a standstill of the panels such as 7.1 and 7.2 during the time which is required for sufficiently setting the plastics for the subsequent panel such as 7.3 in the mould 1.

The fibres 1 can be kept sufficiently tensioned in order to ensure a uniformly straight introduction of the fibres into the panel 7.

Figure 4B:
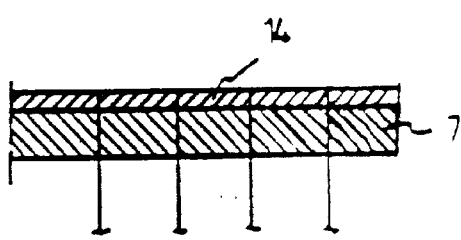

Instead of cutting off the fibre extremities smoothly against the upper surface of a panel as shown at 13 in FIG. 3, it is also possible to cut off the fibres at a small distance from the panel surface, and to embed the extending parts in a cover layer provided on the panel 7, this layer being, in particular, transparant if this layer is thicker than the distance over which the fibres extend. This is schematically shown in FIG. 3 at 14, and FIG. 4B shows a panel obtained in this manner.

In particular such a cover layer 14 can be favourable for protecting the panel, and can also be applied on the separate panels 7 afterwards, e.g. by spraying, and then the operation sequence shown in FIGS. 1, 2A, 2B and 3 will not be slowed down thereby. It is also possible to use such a cover layer 14 for forming small lenses or the like on the fibre extremities, and then the cover layer can consist of a material suitable for this purpose, whereas the panel 7 itself will, then, provide the required strength. When using a coloured cover layer 14, desired colour effects can be obtained. The panel 7 as such can also consist of an opaque material.

Furthermore a panel 7 can be arranged behind a screen with transparent portions coloured in the desired manner, and, in particular, corresponding with the fibre ends, or being provided with a corresponding imprint, in order to allow the representation formed thereby to be observed also in incident daylight.

It is also possible to insert the fibres 2 not through holes 3 of the mould 1, but by means of a corresponding clamp guided perpendicularly to the mould 1 from below. After setting of the plastics, the inserting clamps are released and retracted, whereafter the fibres are pulled through the holes for being cut off at the desired length. Thereafter the fibres are inserted again by means of the clamps into the holes 3.

Figure 5:
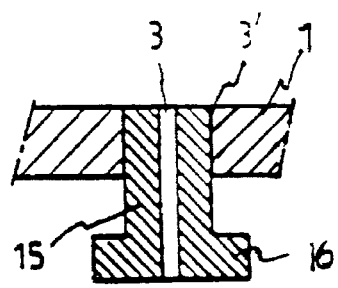
FIG. 5 is a partial section at a larger scale of an other embodiment of the bottom of a forming mould to be used in the method according to the invention.

In FIGS. 1, 2A, 2B and 3, holes 3 in the bottom of the mould 1 are schematically indicated, which are sufficiently small for preventing the liquid plastics to flow out. However, as shown in FIG. 5, it may be favourable to form larger holes 3' in the bottom of the mould 1, and to insert fitting plugs 15 therein which are provided with a bore 3 into which a fibre 2 fits. These plugs 15 can be replaced in a simple manner if they are worn or soiled. These plugs 15 can also be used for simplifying the introduction of the fibres into the mould 1 according to FIG. 1 for the first time, since it is easy to thread the plugs first on the different fibre ends, and to insert them afterwards into the holes 3 of the fixedly mounted mould 1. It is also possible to make the plugs 15 shiftable in such a manner that an already set panel 7 can be pressed out of the mould 1 in the manner of FIG. 2A, and then a collar 16 of the plug 15 can provide a restriction of the stroke thereof.

Using such plugs 15 can, moreover, be favourable when the fibres 2 are to be introduced at an angle. It will be clear that, then, pulling away at least the plate 7.2 as shown in FIG. 3 should be done in a corresponding direction.

A device for executing the above-mentioned method can be constructed in many ways. Apart from a suitable mould 1 and means for supporting the fibre spools 6, pulling means 10 guided in the desired manner should be present for moving in a step-wise manner the formed panels 7 as shown in FIG. 3. Of course this can be realised in many ways. Use can be made then of a sequence control means.

On the other hand it is also possible to form not only one but various strings of fibres 2, depending on the intended use of the panel.

Figure 6A:
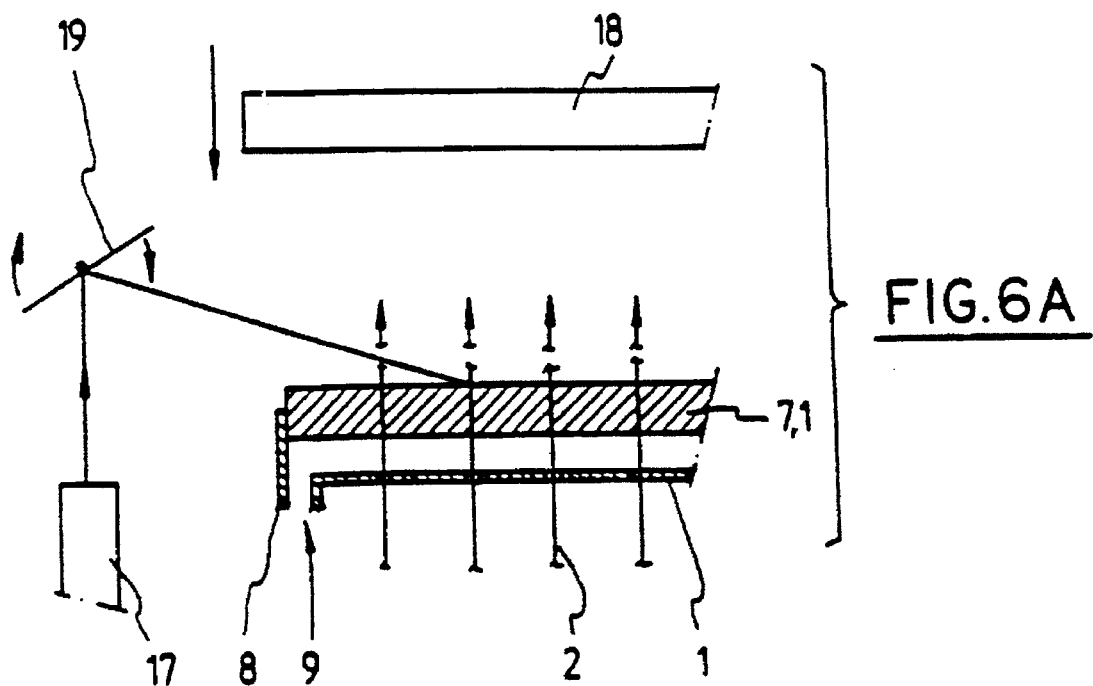
FIGS. 6A and 6B show simplified diagrammatical representations of consecutive steps in an other embodiment of the method according to the invention.

An other manner for removing a first panel 7.1 from the mould 1 is shown in FIG. 6A.

After sufficiently setting of the plastics introduced into the mould 1, the fibre ends extending above the free surface of the first panel 7.1 are cut off by suitable means just above this surface, if required after having moved upwards the panel 7.1 somewhat in the manner described by reference to FIG. 2A by means of introduction of air, so that the free surface of the panel 7.1 extends above the upper rim of the mould 1 (FIG. 6A).

In particular cutting means are used which develop heat in the fibres, e.g. a laser apparatus 17, the laser beam of which is directed by means of suitable movable elements 19 such as rotatable mirrors towards the individual fibres 2, or by means of a heated ultrasonic vibrating knife (not shown).

Using a laser for cutting off the fibres has as an additional advantage that on the cut-off fibre ends situated near the free surface of the panel 7.1 melted nobs are formed acting as a lense.

Figure 6B:
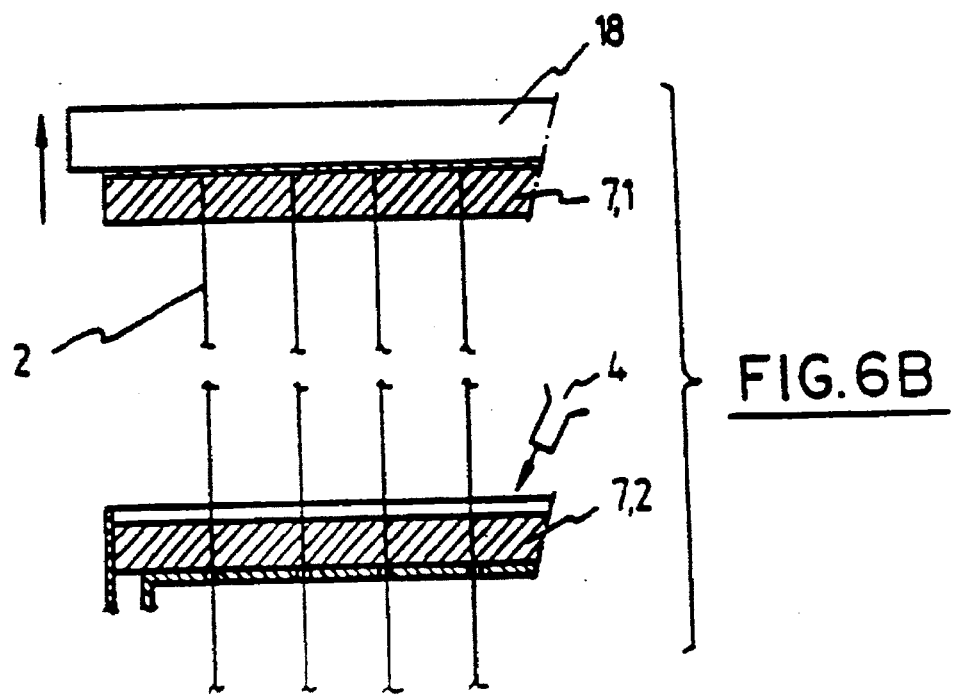

After removing the cut-off fibre ends, a suction plate 18 is subsequently lowered onto the panel 7.1 which after applying a negative pressure applies itself on the panel 7.1. The suction plate 18 can be moved then upwards and takes along the panel 7.1, as well as the fibres 2 which are, in the meantime attached to the plastics of the panel 7.1. (FIG. 6B)

After moving upwards the panel by means of the suction plate until the fibres 2 present below the panel 7.1 have reached the correct length, the mould 1 can be filled again with filling material for forming a second panel 7.2. In the meantime the first panel 7.1 is gripped by a gripper 10, and then the suction by the suction plate 18 can be released.

After cutting off the fibres 2 near the free surface of the second panel 7.2, the suction plate 18 can again be lowered for taking along this panel 7.2 thereafter.

To that end the suction plate 18 can be moved, after releasing the suction, along a track which is situated outside the trajectory of the gripped panel 7.1 which moved still further in a vertical direction. It is also possible to move the gripper 10 with the panel 7.1 at first laterally, and to move the suction 18 thereafter vertically downwards for lowering it onto the second panel 7.2.

When removing a panel 7 from the mould 1, it can be favourable to move this panel at first obliquely from the mould 1 in order to disrupt the adhesion of this panel on the edges of the mould gradually. This can, for instance, be obtained by means of several bottom connections 8, allowing to introduce air consecutively from an edge of the mould. When using the suction plate 18, this can be pulled upwards at first at one edge in order to loosen the panel 7 at that side. This can, for instance, be obtained by means of pneumatic or hydraulic cylinders which are consecutively actuated. Applying a releasing agent in the mould is not possible, since it will also adhere to the fibres 2, which would impair the adhesion thereof to the cast plastics.

The panels 7 described above preferably consist of polyurethane resin. Then, of course, a forming mould 1 should be used to which the liquid polyurethane casting mass will not adhere. Using a releasing or separating agent is not possible, since it would also cover the fibres 2 pulled through which, then, would not or badly unite with the setting casting mass.

For casting polyurethane, usually moulds or forms of teflon will be used which are, however, expensive. Moreover it has appeared that by continually being heated and cooled, structural changes will appear at the casting mould surface, so that, in the course of time, a certain adhesion of the casting mass will take place.

Another draw-back is that the holes 3 should be very carefully drilled so as the prevent casting mass leaking away when pulling through the fibres 2.

In FIGS. 7(A–H) and 7(J–L), successive steps of a method for manufacturing a cheap forming mould for such purposes are diagrammatically represented.

In the first step a counter-mould 20 shown in FIG. 7A is used, made of an easily and smoothly workable material such as wood. Its mould surface 21 adapted to the shape of the mould 1 is sprayed with a silicone mist 22, as shown in FIG. 7B, for forming a separating layer 23 not adhering to polyurethane.

Subsequently, as shown in FIG. 7C, a polyurethane casting mass 24 is poured into the mould 20 which, as shown in FIG. 7D, sets in the mould 20. As shown in FIG. 7E, the mould body 1' thus obtained is, then, removed from the mould 20.

An adhesive 25 is poured into the forming mould body 1' the surplus thereof being removed again, see FIGS. 7F and 7G respectively. A thin layer 26 thereof remains on the mould surface which is dried then, see FIG. 7H.

Subsequently a silicone mass 27 is poured into the mould 1', and the surplus thereof is removed again, see FIGS. 7I and 7J respectively. Then a silicone coating 28 remains which is adhered to the forming mould body 1' by means of the adhesive layer 26.

The forming mould 1 shown in FIG. 7K is now substantially ready for use.

Before using such a forming mould for forming a panel of FIG. 2, the holes 3 should be formed therein. This can be done by drilling holes in the bottom thereof. It is also possible to arrange pegs in the counter-mould 20 of FIG. 7A which, during forming the body 1' form the holes 3 in the required points. The silicone layer 28 covers the holes 3 and is pierced when inserting the fibers 2. This has the advantage that the holes 3 are closed by the elastic silicone layer 28, so that leaking away of the casting mass through the holes is prevented, and it is not necessary that these holes fit closely around the fibres 2. Of course this can also be obtained by drilling the holes before providing the layer 28, or to restrict drilling to the bottom only.

This silicone layer 28 prevents adhesion of the polyurethane mass to the mould 1 when using the latter.

It will be clear that such a casting mould can also be used for casting other shaped pieces of polyurethane than the present panels, and that the same method can also be used for manufacturing moulds or dies for blow, vacuum or injection moulding etc.

In general, in this manner a mould can be obtained which consists of the same material as the material to be formed therewith, this in virtue of the non-adhering coating 28 which is adhered to the similar mould body 1' by means of an adhesive layer 26.

I claim:

1. A method for manufacturing light panels comprising a plate shaped carrier with light conducting fibres fixed therein according to a given pattern, the method comprising the steps of:
   (a) inserting a top end of each fibre from a fibre supply through opening means in a bottom of a mould;
   (b) filling the mould with a castable plastic layer, the castable plastic layer adhering to the fibres;
   (c) allowing the castable plastic layer to set for forming a carrier to retain the fibres; and
   (d) cutting the fibres above the carrier by melting with heat to form a melted nob at the top end of each fibre to act as a lense.

2. The method of claim 1 further comprising the steps of removing the carrier from the mould, and pulling the fibres through the openings in the bottom of the mould.

3. The method of claim 2 further comprising the step of covering the mould with a coating layer before filling the mould with the castable plastic layer, the coating layer being unable to adhere to the castable plastic layer to facilitate the step of removing the carrier from the mould.

4. The method of claim 3 wherein the coating layer is a silicone layer.

5. The method of claim 2 further comprising the step of refilling the mould with another castable plastic layer for forming a next carrier.

6. The method of claim 1 further comprising the step of compressing the bottom ends of the fibres beneath the carrier together into a bundle.

7. The method of claim 6 further comprising the step of cutting the bottom ends of the fibres near the bundle to form a light intake head.

8. The method of claim 2 further comprising the step of inserting removable plugs into the openings in the bottom of the mould, each of the removable plugs having a fibre guiding bore to allow the fibres to be inserted through the removable plugs.

9. The method of claim 8 wherein the removable plugs are inserted into the openings in the bottom of the mould at an angle to facilitate the step of removing the carrier from the mould at such angle.

10. The method of claim 1 wherein the step of cutting the fibres above the carrier by melting with heat is performed with a laser.

11. The method of claim 1 further comprising the step of applying a cover layer on the carrier to embed the top end of each fibre and to protect the carrier.

12. The method of claim 1 wherein the castable plastic layer is a polyurethane.

13. A method for manufacturing light panels comprising a plate shaped carrier with light conducting fibres fixed therein according to a given pattern, the method comprising the steps of:
   (a) inserting a top end of each fibre from a fibre supply through opening means in a bottom of a mould;
   (b) filling the mould with a castable plastic layer, the castable plastic layer adhering to the fibres;
   (c) allowing the castable plastic layer to set for forming a carrier to retain the fibres;
   (d) cutting off the fibres above the carrier by melting with heat to form a nob at the top end of each fibre to act as a lense and to expose a determined length of the fibres above the carrier; and
   (e) applying a cover layer on the carrier to embed the exposed fibre ends and to protect the carrier.

14. The method of claim 13 further comprising the steps of removing the carrier from the mould, and pulling the fibres through the openings in the bottom of the mould.

15. The method of claim 14 further comprising the step of covering the mould with a coating layer before filling the mould with the castable plastic layer, the coating layer being unable to adhere to the castable plastic layer to facilitate the step of removing the carrier from the mould.

16. The method of claim 15 wherein the coating layer is a silicone layer.

17. The method of claim 14 further comprising the step of refilling the mould with another castable plastic layer for forming a next carrier.

18. The method of claim 14 further comprising the step of inserting removable plugs into the openings in the bottom of the mould, each of the removable plugs having a fibre guiding bore to allow the fibres to be inserted through the removable plugs.

19. The method of claim 18 wherein the removable plugs are inserted into the openings in the bottom of the mould at a desired angle to facilitate the step of removing the carrier from the mould at the desired angle.

20. The method of claim 13 wherein the step of cutting off the fibres above the carrier is done by melting with heat to form a melted nob at the top end each fibre to act as a lense.

21. The method of claim 20 wherein a laser is used in the step of cutting off the fibres above the carrier.

22. The method of claim 13 further comprising the step of compressing the bottom ends of the fibres beneath the carrier together into a bundle.

23. The method of claim 22 further comprising the step of cutting the bottom ends of the fibres near the bundle to form a light intake head.

24. The method of claim 13 wherein the fibres are tensioned while the mould is filled with the castable plastic layer.

25. The method of claim 13 wherein the castable plastic layer is a polyurethane.

26. A method for manufacturing light panels comprising a plate shaped carrier with light conducting fibres fixed therein according to a given pattern, the method comprising the steps of:
   (a) providing a plurality of removable plugs each having a fibre guiding bore;
   (b) inserting a plurality of fibres through the fibre guiding bores of the plurality of removable plugs;
   (c) inserting the plurality of removable plugs through opening means in a bottom of a mould to facilitate the insertion of the fibres through the mould;

(d) casting a carrier to retain the fibres by filling the mould with a castable plastic layer and allowing the castable plastic layer to set with the top ends of the fibres extending above the carrier;

(e) removing the carrier from the mould while the fibres are attached and lifting the carrier to a position to obtain a desired fibre length while pulling the fibres through the removable plugs; and (f) cutting the top ends of the fibres extending above the carrier.

27. The method of claim 26 further comprising the steps of removing the carrier from the mould, and pulling the fibres through the openings in the bottom of the mould.

28. The method of claim 27 wherein the removable plugs are inserted through the openings in the bottom of the mould at a desired angle to facilitate the step of removing the carrier from the mould at the desired angle.

* * * * *